United States Patent [19]

Spatafora et al.

[11] Patent Number: 5,299,890

[45] Date of Patent: Apr. 5, 1994

[54] UNIT FOR SUPPLYING PRODUCTS TO A MANUFACTURING MACHINE

[75] Inventors: Mario Spatafora; Antonio Gamberini, both of Bologna, Italy

[73] Assignee: G. D Societa' per Azioni, Bologna, Italy

[21] Appl. No.: 693,361

[22] Filed: Apr. 30, 1991

[30] Foreign Application Priority Data

May 11, 1990 [IT] Italy ................... 3500 A/90

[51] Int. Cl.⁵ .............................................. B65G 51/03
[52] U.S. Cl. ...................................................... 406/88
[58] Field of Search ................................... 406/86-88, 406/93, 94

[56] References Cited

U.S. PATENT DOCUMENTS

| | | | |
|---|---|---|---|
| 2,805,898 | 9/1957 | Willis, Jr. | 406/88 |
| 3,279,863 | 10/1966 | Bouladon et al. | 406/88 X |
| 3,350,140 | 10/1967 | Strydom | 406/88 |
| 4,081,201 | 3/1978 | Hassan et al. | 406/88 |
| 4,561,806 | 12/1985 | Lenhart | 406/88 |
| 4,679,699 | 6/1987 | Leonov | |
| 4,730,956 | 3/1988 | Lenhart | 406/86 X |
| 4,828,434 | 5/1989 | Fairman et al. | 406/87 X |

FOREIGN PATENT DOCUMENTS

| | | | |
|---|---|---|---|
| 54899 | 6/1982 | European Pat. Off. | 406/88 |
| 2483377 | 12/1981 | France | 406/87 |
| 132016 | 5/1990 | Japan | 406/86 |
| 1288686 | 9/1972 | United Kingdom . | |
| 1353741 | 5/1974 | United Kingdom | 406/88 |
| 2192848 | 1/1988 | United Kingdom . | |

OTHER PUBLICATIONS

Apgar et al., Self-Centering Air Lift Transport, Dec. 1975, IBM Technical Disclosure Bulletin, vol. 18, No. 7.

Gagne et al., Device Air Transport System, Jun. 1978, IBM Technical Disclosure Bulletin, vol. 21, No. 1.

Hassan et al., Sep. 1979, IBM Tech. Disc. Bull., vol. 22, No. 4, Minimum Cost Concept for Contactless Air Film . . . .'

Primary Examiner—David M. Mitchell
Assistant Examiner—Gary C. Hoge
Attorney, Agent, or Firm—Klauber & Jackson

[57] ABSTRACT

A pneumatic unit for supplying products, such as chocolates or similar, in a single line to a manufacturing machine along a route defined laterally by two walls and at the bottom by a plate through which are formed a number of nozzles for a pressurized pneumatic fluid; the nozzles being arranged in at least two rows symmetrical with the route; and each nozzle in each row being so designed as to emit a jet of pneumatic fluid, at least a first portion of which is directed in a traveling direction towards the manufacturing machine, and a second portion of which is directed transversely in relation to the traveling direction and towards the other row of nozzles.

7 Claims, 1 Drawing Sheet

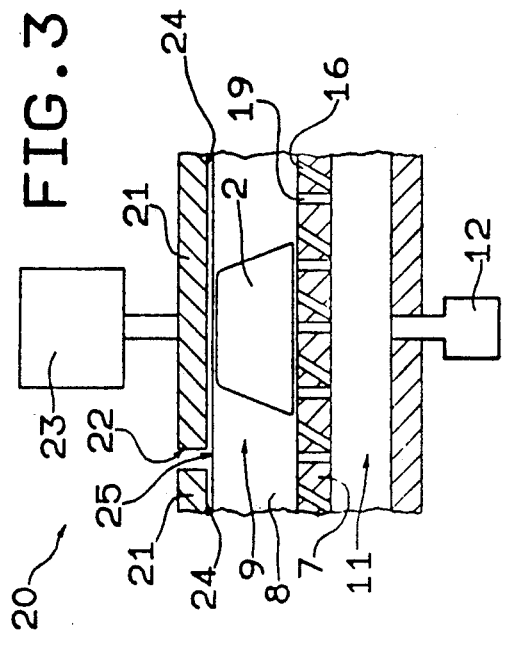
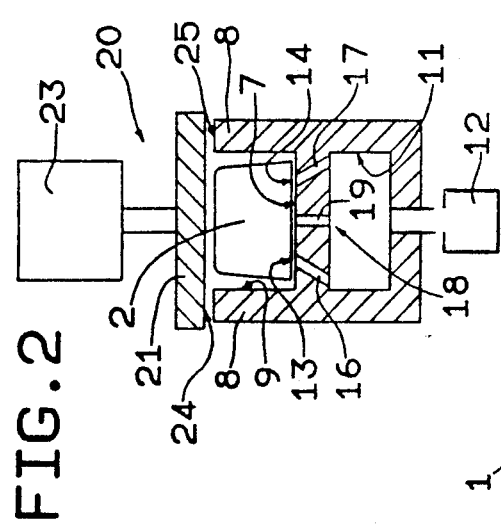
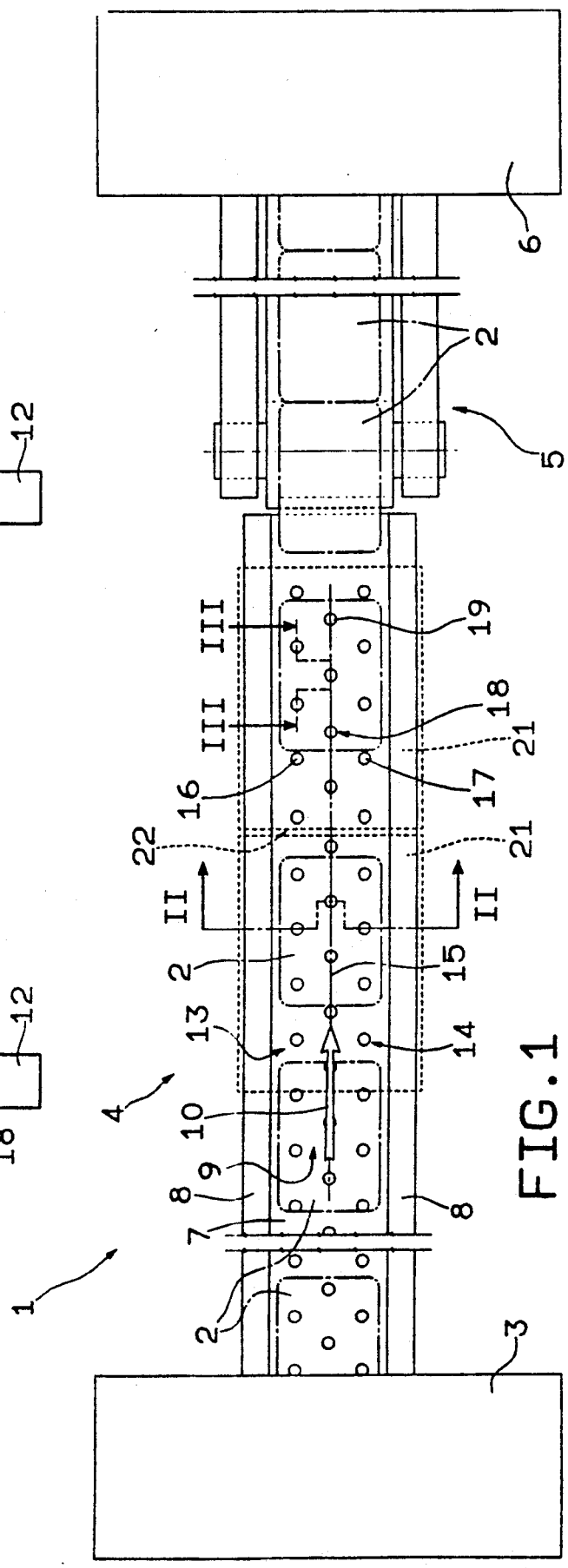

UNIT FOR SUPPLYING PRODUCTS TO A MANUFACTURING MACHINE

BACKGROUND OF THE INVENTION

The present invention relates to a unit for supplying products to a manufacturing machine.

In particular, the present invention relates to a unit for supplying small, compact products, and designed for installation between two manufacturing machines, one of which, located downstream from the supply unit, presents a lower operating speed as compared with the upstream machine.

In the following description, specific reference is made, purely by way of example, to a unit for supplying chocolates and installed between a chocolate manufacturing and wrapping machine.

Chocolate manufacturing systems are known to feature manufacturing machines having a number of outputs, to each of which the chocolates are fed at a first given speed and transferred, via an intermediate supply unit, on to the input conveyor of one or more wrapping machines, the input conveyor of which operates in time with the wrapping members on the wrapping machine and at a second speed lower than said first speed.

The supply unit, usually consisting of a conveyor belt, is normally set to such a speed that the chocolates fed on to it off the manufacturing machine are spaced a given distance apart.

Naturally, if the input conveyor to the wrapping machine is operated at a slower speed than the supply unit, the distance between adjacent chocolates on the input conveyor is shortened. The difference between the two speeds may reach a critical point at which the chocolates on the input conveyor actually contact one another, or an even more critical point at which the continuous stream of chocolates on the input conveyor to the wrapping machine extends as far back as the supply unit conveyor, the sliding belt of which tends to damage the underside of the chocolates. Moreover, the scraps of chocolate so produced may melt in contact with the supply unit belt, thus resulting in frequent stoppages of the entire system for cleaning and maintenance.

To overcome the above drawback, the supply unit may consist of a pneumatic conveyor, for example, of the type described and claimed in Canadian Patent N.903140. In this case, each chocolate could be fed forward on a respective air cushion defined by a number of nozzles formed through a bottom plate on the conveyor and so designed as to emit an a r jet comprising two components, one directed upwards and the other inclined slightly forward in the traveling direction of the products.

When applied to two machines of different capacity, a pneumatic conveyor of the aforementioned type provides for effectively supporting the chocolates as they are fed forward, bu not for supporting them pneumatically in a stationary position over the perforated plate, in the event the difference in the speed of the two machines exceeds said critical value. When stationary, in fact, the chocolates tend to vibrate against one another, thus resulting in damage.

SUMMARY OF THE INVENTION

It is an object of the present invention to provide a supply unit, in particular a pneumatic supply unit, for products of the aforementioned type, in particular chocolates, designed to overcome the aforementioned drawbacks.

According to the present invention, there is provided a supply unit, in particular a pneumatic supply unit, for supplying compact, relatively heavy products, in particular chocolates or similar, to a manufacturing machine, said unit presenting an output end; lateral guide means defining a route along which said products are fed in orderly succession and in a direction towards said output end; a bottom plate located along said route; a number of nozzles formed through said bottom plate; and means or supplying said nozzles with pressurized pneumatic fluid; said nozzles being arranged in at least two rows along and symmetrically in relation to said route; and each said nozzle being so designed as to emit a jet of pneumatic fluid having a component directed parallel to said route and in said traveling direction; characterised by the fact that each said nozzle in each said row is also designed so that the respective said jet presents a component directed transversely in relation to said traveling direction and towards the other row of nozzles.

BRIEF DESCRIPTION OF THE DRAWINGS

A non-limiting embodiment of the present invention will be described by way of example with reference to the accompanying drawings, in which:

FIG. 1 shows a schematic plan view, with parts removed for simplicity, of a chocolate manufacturing system comprising a preferred embodiment of the supply unit according to the present invention;

FIG. 2 shows a larger-scale section along line II—II in FIG. 1;

FIG. 3 shows a larger-scale section along line III-—III in FIG. 1.

DETAILED DESCRIPTION OF THE INVENTION

Number 1 in FIG. 1 indicates a system for manufacturing chocolates 2 and comprising a known manufacturing machine 3, the output end of which is connected by a pneumatic supply unit 4 to the input conveyor 5 of a known wrapping machine 6. Conveyor 5 is generally a conveyor belt operated at a given speed as a function of the instantaneous operating capacity of wrapping machine 6.

Unit 4 presents an output end facing the input end of conveyor 5, and comprises a bottom plate 7 and two lateral guide walls 8 defining, with plate 7, a channel 9 for feeding a neat line of chocolates 2 over plate 7 to said output end and in the direction of arrow 10.

Plate 7 defines the top cover wall of an output duct 11 of a device 12 supplying pressurized pneumatic fluid normally consisting of air. Duct 11 extends beneath channel 9 and communicates with the same via two rows of nozzles 13 and 14 arranged symmetrically in relation to the central longitudinal axis 15 of channel 9.

As shown in FIGS. 2 and 3, the nozzles in rows 13 and 14 are defined by respective holes 16 and 17 formed through plate 7, and are oriented or designed in such a manner as to emit a respective jet of pneumatic fluid in a respective direction having a main component directed upwards, a first secondary component in the direction of arrow 10, and a second secondary component directed transversely in relation to arrow 10 and towards the other row of nozzles.

The above characteristic is achieved by virtue of each hole 16, 17 slanting slightly forwards in the direction of arrow 10 and towards a corresponding hole 17, 16. Generally speaking, said two tilt angles preferably range between 10 and 30 degrees.

Unit 4 also comprises a third row of nozzles 18 formed through plate 7 along axis 15 and each defined by a respective hole 19 perpendicular to plate 7 and offset in relation to two adjacent holes 16 and two corresponding holes 17 to form a so-called "quincunx" arrangement.

The nozzles in said third row 18 are designed to emit a jet of pneumatic fluid perpendicular to both the direction of arrow 10 and plate 7.

Finally, unit 4 comprises an accelerating device 20 assigned to said lateral walls 8 for varying within a given range the thrust exerted on chocolates 2 in the direction of arrow 10 by the jets from holes 16 and 17. Device 20 comprises a cover over channel 9, defined by a number of plates 21 (only two of which are shown in FIG. 1) aligned along channel 9, parallel to plate 7, and separated longitudinally by a transverse slot 22 of given width. By means of respective selectively operated actuating devices 23, plates 21 are moved to and from plate 7 for varying as required a gap 24 defined between each plate 21 and the top edge 25 of each lateral wall 8.

In actual use, machine 3 is operated so as to produce chocolates 2 at a given speed and feed them to supply unit 4, which in turn feeds them on to conveyor 5 and wrapping machine 6.

As it travels along channel 9, each chocolate 2, depending on its length, cooperates with a variable number of holes 16, 17 and 19, the output jets of which provide not only for supporting chocolate 2 in perfectly stable manner on a sort of air cushion, but also, when possible, for feeding it forward in the direction of arrow 10 and at a speed controllable within a relatively wide range by accelerating device 20.

The above is a direct consequence of the arrangement of holes 16 and 17, the output jets of which, by virtue of sloping both forwards in the direction of arrow 10 and towards one another, are deflected on the bottom of chocolates 2 so as to clash and form a pressure ridge extending along axis 15. Said pressure ridge substantially reflects the jets so as to form, for each row 13 and 14, a continuous series of practically stationary vortices along which the pneumatic fluid travels at a given speed in the direction of arrow 10. Each said stationary vortex combines with a corresponding vortex on the opposite side of channel 9 in relation to said pressure ridge to form a V with its apex facing the opposite way to arrow 10. Said V arrangement is due to both the energy expended by the jets for forming said central pressure ridge and the lesser resistance encountered by the pneumatic fluid in the vicinity of lateral walls 8.

As each said vortex is comparable to a roller, the jets from holes 16 and 17 may safely be said to form, beneath chocolates 2 and along the entire length of channel 9, two series of inclined idle rollers for supporting chocolates 2 in a stable, i.e. vibrationfree, position, the stability of which increases in proportion to the extent to which the rollers are inclined towards 45° in relation to axis 15. The stability of chocolates 2 inside channel 9 is further improved by the jets from holes 19, each of which defines an aerodynamic source comparable to a substantially cylindrical section pillar located along axis 15 between plate 7 and the bottom of chocolate 2. Said source provides both for supporting chocolate 2 in perfectly stable manner on abandoning holes 16 and 17, and for increasing the rearward slope of said stationary vortices to come as close as possible to said optimum 45° angle.

In connection with the above, it should be pointed out that, unlike known pneumatic conveyors, on which the jets are only inclined forwards and provide for creating beneath the products a substantially laminar air flow largely responsible for the forward thrust on the products, and the thickness of which varies (causing vibration) alongside a variation in the traveling speed of the products, on supply unit 4, the stationary vortices formed beneath chocolates 2 provide hardly at all for feeding chocolates 2 along channel 9, and present diameters substantially independent of the traveling speed of chocolates 2. Chocolates 2 in fact are mainly fed forward by the "sail effect" of the thrust exerted by the pneumatic fluid escaping from channel 9 through the gaps between chocolates 2 and lateral walls 8 and in a direction the component of which in the direction of arrow 10 is inversely proportional to the width of gap 24.

In other words, on unit 4, chocolates 2 are fed in vibraionfree manner along channel 9, and are in no way damaged if arrested contacting one other at the input end of conveyor 5.

We claim:

1. A pneumatic supply unit (4), for supplying compact, relatively heavy products (2), to a manufacturing machine (6), said unit (4) having an output end, and comprising lateral guide means (8) defining a route along which said products (2) are fed and travel in a single file, in orderly succession and in a traveling direction (10) towards said output end; a bottom plate (7) located along said route; a number of nozzles (16, 17) formed through said bottom plate (7); and means (12) for supplying said nozzles (16, 17) with pressurized pneumatic fluid; said nozzles (16, 17) being arranged in at least two rows (13, 14) along and symmetrically in relation to said route; and each said nozzle (16, 17) in each said row (13, 14) being so designed as to emit a jet of pneumatic fluid having a first component directed parallel to said route and in said traveling direction (10) and a second component directed transversely in relation to said traveling direction (10) and towards the other row (14, 13) of nozzles (16, 17); wherein said lateral guide means (8) comprise two lateral walls extending along said route and defining, with said bottom plate (7), a channel (9) along which to feed an orderly row of said products (2); with accelerating means (20) being associated with said lateral walls (8) for varying, within a given range, the forward thrust exerted on said products (2) in said traveling direction (10); and wherein said accelerating means (20) comprise a cover for said channel (9), and actuating means (23) for moving said cover to and from said bottom plate (7).

2. A supply unit as claimed in claim 1, wherein said cover comprises at least two cover plates (21) aligned along said route, parallel to said bottom plate (7); said cover plates (21) being associated with said actuating means (23), and being located a given distance apart in said traveling direction (10).

3. A pneumatic supply unit (4), for supplying compact, relatively heavy products (2), to a manufacturing machine (6), said unit (4) having an output end, and comprising lateral guide means (8) defining a route along which said products (2) are fed and travel in a single file, in orderly succession and in a traveling direction (10) towards said output end; a bottom plate (7) located along said route and defining together with said lateral guide means (8) a trough-shaped channel (9) along which to feed an orderly row of said products (2); a number of nozzles (16, 17) formed through said bottom plate (7); means (12) for supplying said nozzles (16, 17) with pressurized pneumatic fluid; and accelerating means (20) associated with said lateral guide means (8) for varying, within a given range, the forward thrust exerted on said products (2) in said travelling direction (10); said nozzles (16, 17) being arranged in at least two rows (13, 14) along and symmetrically in relation to said route; each said nozzle (16, 17) in each said row (13, 14) being so designed as to emit a jet of pneumatic fluid having a first component directed parallel to said route and in said traveling direction (10) and a second component directed transversely in relation to said traveling direction (10) and towards the other row (14, 13) of nozzles (16, 17); and said accelerating means (20) comprising a cover for said channel (9), and actuating means (23) for moving said cover to and from said bottom plate (7).

4. A supply unit as claimed in claim 3, characterized by the fact that it comprises a third row (18) of nozzles (19) formed through said bottom plate (7); said third row (18) being located directly between and adjacent said other two rows (13, 14) with all of its nozzles (19) offset from said other two row (13, 14), to form a quincunx arrangement, in relation to said nozzles (16, 17) in said other two rows (13, 14).

5. A supply unit as claimed in claim 4, wherein said nozzles (19) in said third row (18) are so designed as to emit a respective jet of pneumatic fluid perpendicular to both said traveling direction (10) and said bottom plate (7).

6. A supply unit as claimed in claim 3, wherein said cover comprises at least two cover plates (21) aligned along said route, parallel to said bottom plate (7); said cover plates (21) being associated with said actuating means (23), and being located a given distance apart in said traveling direction (10).

7. A supply unit as claimed in claim 3, wherein said lateral guide means (8) comprise two lateral walls extending along said route and laterally defining said channel (9).

* * * * *